United States Patent

[11] 3,586,364

| [72] | Inventors | Karl Wilfert<br>Gerlingen-Waldstadt;<br>Bela Barenyi, Stuttgart-Vaihingen, both of, Germany |
|---|---|---|
| [21] | Appl. No. | 776,020 |
| [22] | Filed | Nov. 15, 1968 |
| [45] | Patented | June 22, 1971 |
| [73] | Assignee | Daimler-Benz Aktiengesellschaft<br>Stuttgart-Unterturkheim, Germany |
| [32] | Priority | Nov. 15, 1967 |
| [33] | | Germany |
| [31] | | D54,611 |

[54] VEHICLE BODY CONSTRUCTION SECURED AT THE SUPPORT STRUCTURE OF A MOTOR VEHICLE
22 Claims, 10 Drawing Figs.

[52] U.S. Cl. .................................................. 296/28 R
[51] Int. Cl. ...................................................... B62d 25/02
[50] Field of Search............................................ 296/28, 29

[56] References Cited
UNITED STATES PATENTS

| 2,043,050 | 6/1936 | Lundberg....................... | 296/28.5 |
| 2,383,611 | 8/1945 | Marcy........................... | 296/28 UX |

FOREIGN PATENTS

| 178,014 | 8/1953 | Austria......................... | 296/28 |
| 894,056 | 10/1953 | Germany....................... | 296/28 |
| 919,342 | 2/1963 | Great Britain................. | 296/28 |

Primary Examiner—Benjamin Hersh
Assistant Examiner—John A. Pekar
Attorney—Craig, Antonelli, Stewart & Hill ABSTRACT: A vehicle body construction for motor vehicles, especially passenger motor vehicles which is mounted on a support structure and in which the lateral body panels in the front and/or rear area of the vehicle from in front the rear up to the door, consist of at least two separate parts.

PATENTED JUN22 1971 3,586,364
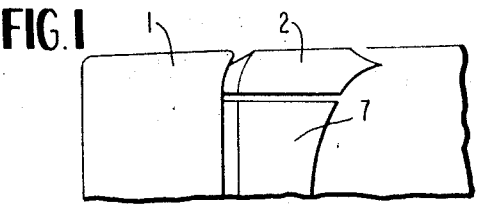
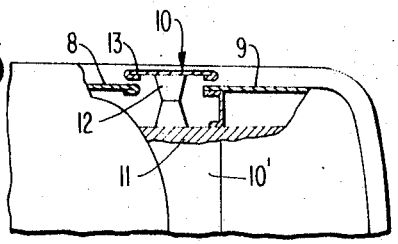
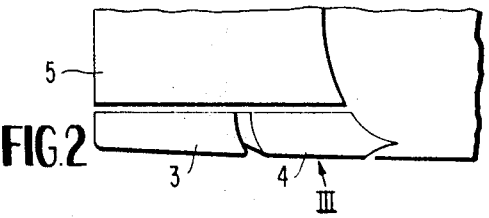
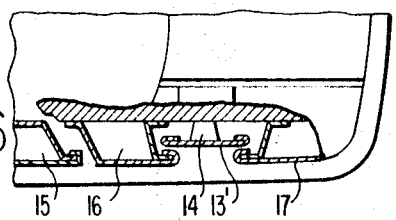
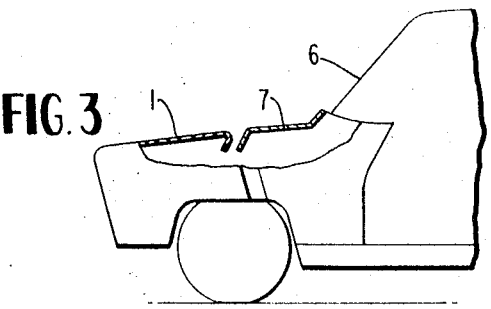
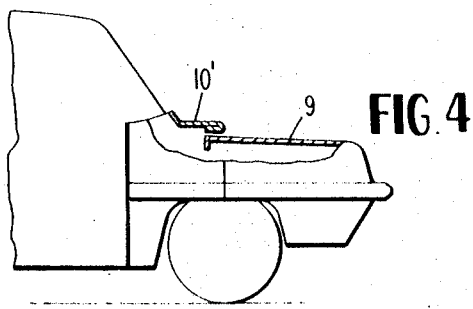
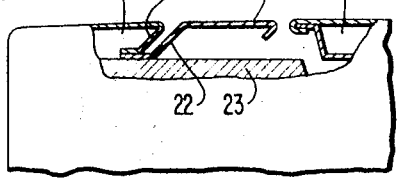
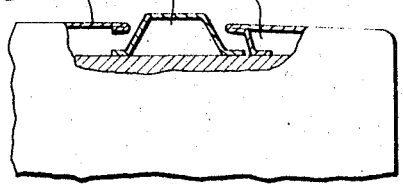
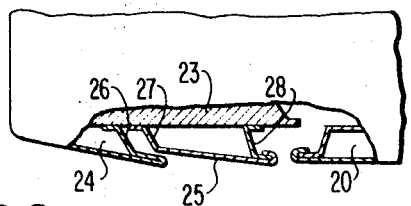
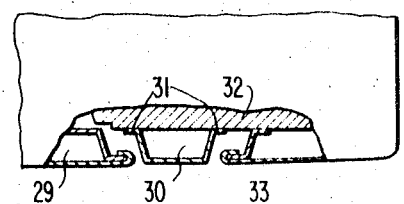
INVENTORS
KARL WILFERT
BELA BARENYI
BY Craig & Antonelli
ATTORNEYS

VEHICLE BODY CONSTRUCTION SECURED AT THE SUPPORT STRUCTURE OF A MOTOR VEHICLE

The present invention relates to the construction of body panels mounted at the relatively fixed support structure of a motor vehicle, especially of a passenger motor vehicle.

It has proved as disadvantageous with the known body panel construction in motor vehicles that during deformations as a result of an accident, especially in case of deformation of the lateral body panels, the door of the motor vehicle cannot be opened any longer because the body panels have been displaced into the swinging or pivot area of the door.

The present invention aims at avoiding these disadvantages and therewith to increase the safety of the motor vehicle. The present invention essentially consists in that the lateral body paneling consists of at least two separate parts in the front and/or the rear area from in front or from the rear up to the door. In particular, during an impact or collision accident only the forward or rear part is essentially deformed with such a type of construction whereas the part of the body paneling adjoining the door is deformed only slightly, if at all, so that the swinging or pivot area of the door is not impaired.

Advantageously, the two parts may be secured at a common, preferably flat surface of the fixed support structure which may be constituted, for example, by a part of the frame or a part of a self-supporting-type body construction. In order to avoid having to maintain excessively close tolerances during the manufacture and during the assembly, provision may be made in an extraordinarily advantageous manner that the outer surfaces of the two parts are disposed in different planes. A gap is created thereby which is far-reachingly insensitive against assembly and manufacturing inaccuracies.

In a structurally simple manner, a part which is trapezoidally shaped in cross section, may be arranged between the door and the forward or rear part.

According to a further feature and development of the present invention, one or several support elements may be secured at the relatively fixed support structure between the door and the forward or rear part, which support elements carry a sheet metal panel forming the outer surface. In order to achieve also in this case a step-shaped gap, the sheet metal panel may overlap the two adjoining parts.

An extraordinarily advantageous type of construction of the present invention is obtained if the two parts consist of profiled or sectional sheet metal members which are secured at the fixed support structure by means of webs inclined obliquely inwardly or forwardly. The two parts may be arranged thereby in a scalelike manner. It is possible thereby to obtain a large deformation path between the two parts without the creation of a large gap visible from the outside.

Accordingly, it is an object of the present invention to provide a vehicle body paneling which obviates by simple means the aforementioned shortcomings and drawbacks encountered in the prior art.

Another object of the present invention resides in a vehicle body panel construction which greatly increases the safety of the motor vehicle in case of accidents or collisions.

A further object of the present invention resides in a body panel construction secured at a support part of a motor vehicle which minimizes the danger of impairment to door opening in case of deformation, especially of lateral body panels.

Still a further object of the present invention resides in a motor vehicle body in which the danger of deformation of the door panels in case of deformation of other lateral body panels is greatly minimized, if not completely eliminated.

Another object of the present invention resides in a motor vehicle body paneling which not only achieves all of the aforementioned aims and objects by simple and inexpensive means but additionally reduces the need for small tolerances of the body parts during manufacture and assembly.

These and other objects, features and advantages of the present invention will become more obvious from the following description when taken in connection with the accompanying drawing which shows, for purposes of illustration only several embodiments in accordance with the present invention, and wherein:

FIG. 1 is a partial somewhat schematic plan view on the front or rear area of a passenger motor vehicle;

FIG. 2 is a somewhat schematic, partial plan view, similar to FIG. 1, on a modified embodiment of a passenger motor vehicle in accordance with the present invention;

FIG. 3 is somewhat schematic, partial side elevational view, partly in cross section, of the passenger motor vehicle of FIG. 1, taken in the direction of arrow III;

FIG. 4 is a somewhat schematic, partial side elevational view, partly in cross section, and similar to FIG. 3, through a modified construction of a passenger motor vehicle in accordance with the present invention;

FIG. 5 is a somewhat schematic, partial plan view, partly in cross section, on the embodiment of a passenger motor vehicle body according to FIG. 4;

FIG. 6 is a somewhat schematic, partial plan view, partly in cross section and similar to FIG. 5, on a further modified embodiment of a passenger motor vehicle;

FIG. 7 is a somewhat schematic, partial plan view, partly in cross section, through still another modified embodiment of a passenger motor vehicle in accordance with the present invention;

FIG. 8 is a somewhat schematic, partial plan view, partly in cross section, on still a further modified embodiment of a passenger motor vehicle in accordance with the present invention;

FIG. 9 is a somewhat schematic, partial plan view, partly in cross section, through a further embodiment of a passenger motor vehicle in accordance with the present invention; and FIG. 10 is a somewhat schematic, partial plan view, partly in cross section and similar to FIG. 9, on a still further embodiment, of a passenger motor vehicle in accordance with the present invention.

Referring now to the drawing, wherein like reference numerals are used throughout the various views to designate like parts, FIGS. 1,2,5,6,7, 8,9,10 merely show one-half of the motor vehicle section which is constructed axially symmetrical with respect to the center longitudinal axis of the vehicle. Since in modern passenger motor vehicles, the front area and the rear area of the motor vehicle are constructed similarly, only a partial view of a passenger motor vehicle is illustrated in each case in the drawing which is suitable both for the rear area as well as also for the front area of the vehicle. In order to prevent that by reason of deformations in case of an accident, the body panels impairs the swinging or pivot range of the motor vehicle door, the lateral body paneling is subdivided into two parts 1 and 2. As shown in FIG. 1, the forward part 1 may simultaneously form the engine or luggage space hood, or as illustrated in FIG. 2, two parts 3 and 4 may be provided which are limited only to the lateral paneling of the motor vehicle whereas a separate engine space or luggage space hood 5 is provided.

The part 7 which remains between the windshield or rear window 6 and the forward or rearward part 1 of the body paneling constructed as engine space or luggage space hood, may be constructed independently of the lateral body panel parts 1,2,3, and 4 as illustrated by FIGS. 1 and 3. However, it can also be constructed as a part 10, as illustrated in the embodiments according to FIGS. 4 and 5, in one piece with the part 10 arranged between the door 8 and the rear of forward part 9 of the body paneling.

In the embodiment according to FIG. 5, the part 9 of the paneling consisting of a sheet metal profile and forming simultaneously the engine space hood or luggage space hood as well as also several support elements 12 are secured at the common flat surface of the support structure 11 whereby the support elements 12 carry a sheet metal panel 13 that overlaps the door 8 and the forward or rearward part 9 of the paneling. The sheet metal panel 13 forming the outer surface of this part 10 of the body paneling avoids by this arrangement any visible gaps between the parts 9 and 10 of the paneling.

Additionally, a large deformation path for the forward or rearward part 9 of the body paneling is created thereby.

The body paneling according to the embodiment of FIG. 6 is constructed in a similar manner; however, the paneling up to the door 15 consists of three parts. Additionally, the support elements 14 are so constructed that the sheet metal panel 13' lies behind the plane formed by the part 16 and the rear part 17 of the paneling. Also in this case visible gaps are avoided so that small tolerances also need not be maintained in this case during the assembly and during the manufacture.

In the embodiment according to FIG. 7, the two parts 18 and 19 of the body paneling are arranged in a common plane with the motor vehicle door 20. The parts 18 and 19 consist of sheet metal profiles or sectional members and are secured at a common flat surface of the support structure 23 by means of webs 21 and 22 which are inclined in the direction of the possible deformation. In this embodiment, the part 19 of the body paneling adjoining the door 20 is provided with only one web 22 which, together with the forward or rear part 18 of the body paneling is secured at the framelike support structure 23.

In the embodiment according to FIG. 8, the parts 24 and 25 of the body paneling which are constructed as sheet metal profiles or sectional members similarly as in the embodiment according to FIG. 7, are also secured at the framelike support structure 23 by means of inclined webs 26, 27 and 28. The outer surfaces of the two sheet metal profiles 24 and 25 are arranged in approximately parallel planes and the forward or rear part 24 overlaps the adjoining part 25 in a scalelike manner. The webs 26 and 27 are constructed in one piece with the sheet metal profiles or sectional members 24 and 25, and the web 28 of the part 25 directed toward the door 20 consists only of an approximately U-shaped profile which is connected with the sheet metal profile.

According to the embodiment of FIG. 9, the part 30 of the body paneling adjoining the door 29 is trapezoidally shaped in cross section and together with the forward or rear part 33 of the body paneling is secured by means of flanges 31 at a common plane of the framelike support structure 32. The outer surfaces of the two lateral parts 30 and 33 of the body paneling and of the door 29 are arranged in this embodiment in one plane. In order to enable a more favorable construction of the gaps, provision may be made, as illustrated in FIG. 10 that the trapezoidally shaped part 34 overlaps outwardly the surfaces of the door 29 and of the forward or rear part 33 of the body paneling.

While we have shown and described several embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A body construction mounted at a support structure of a motor vehicle, especially of a passenger motor vehicle, characterized by lateral body panel means consisting of at least two separate parts projecting outwardly beyond the plane of the support structure within the end area from the respective end up to the corresponding door, said parts defining an approximately vertical gap which extends therebetween.

2. A vehicle body construction according to claim 1, wherein the outer surfaces of said two parts are disposed in different planes.

3. A vehicle body construction according to claim 1, wherein one of said parts is substantially trapezoidally shaped in cross section and is connected to the support structure between the door and the other part of the corresponding end section of the vehicle.

4. A vehicle body construction according to claim 1, wherein at least one support element is secured at the support structure between the door and one of said parts, said support element carrying a sheet metal panel forming the outer surface.

5. A vehicle body construction according to claim 4, wherein said sheet metal panel overlaps the two adjoining parts.

6. A vehicle body construction according to claim 1, wherein said two parts consist of profiled sheet metal members which are secured at the support structure by means of web portions inclined obliquely toward the respective vehicle end.

7. A vehicle body construction according to claim 6, wherein said two parts are arranged in an overlapping manner.

8. A vehicle body construction according to claim 1, wherein the vehicle includes a transversely extending window and a hood covering a vehicle space disposed below the hood, the part of the body between said window and said hood being integral with the part arranged between the door and the other of said two parts.

9. A vehicle body construction according to claim 1, wherein said two parts are arranged within the front area of the vehicle.

10. A vehicle body construction according to claim 1, wherein said two parts are arranged within the rear area of the vehicle.

11. A vehicle body construction according to claim 1, wherein said two parts are secured at a common surface of the support structure.

12. A vehicle body construction according to claim 11, wherein said common surface is a flat surface.

13. A vehicle body construction according to claim 11, wherein the outer surfaces of said two parts are disposed in different planes.

14. A vehicle body construction according to claim 11, wherein one of said parts is substantially trapezoidally shaped in cross section and is connected to the support structure between the door and the other part of the corresponding end section of the vehicle.

15. A vehicle body construction according to claim 11, wherein at least one support element is secured at the support structure between the door and one of said parts, said support element carrying a sheet metal panel forming the outer surface.

16. A vehicle body construction according to claim 15, wherein said sheet metal panel overlaps the two adjoining parts.

17. A vehicle body construction according to claim 16, wherein the outer surfaces of said two parts are disposed in different planes.

18. A vehicle body construction according to claim 11, wherein said two parts consist of profiled sheet metal members which are secured at the support structure by means of web portions inclined obliquely toward the respective vehicle end.

19. A vehicle body construction according to claim 18, wherein said two parts are arranged in an overlapping manner.

20. A vehicle body construction according to claim 11, wherein the vehicle includes a transversely extending window and a hood covering a vehicle space disposed below the hood, the part of the body between said window and said hood being integral with the part arranged between the door and the other of said two parts.

21. A vehicle body construction according to claim 20, wherein said window is a windshield and the hood is an engine space hood.

22. A vehicle body construction according to claim 20, wherein said window is a rear window pane and said hood is a luggage space hood.